(12) United States Patent
Jette

(10) Patent No.: US 6,460,812 B1
(45) Date of Patent: Oct. 8, 2002

(54) FLEXIBLE CABLE SUPPORT APPARATUS AND METHOD

(76) Inventor: Roger Jette, 17 Prospect St., Babylon, NY (US) 11702

( * ) Notice: Subject to any disclaimer, the term of this patent is extended or adjusted under 35 U.S.C. 154(b) by 0 days.

(21) Appl. No.: 09/603,063

(22) Filed: Jun. 26, 2000

Related U.S. Application Data

(60) Provisional application No. 60/140,915, filed on Jun. 24, 1999.

(51) Int. Cl.7 .................................................. F16L 3/06
(52) U.S. Cl. ........................................ 248/49; 248/68.1
(58) Field of Search ............................. 248/49, 52, 58, 248/65, 68.1, 75, 302, 51; 174/68.1, 68.3, 95, 97, 208, 209

(56) References Cited

U.S. PATENT DOCUMENTS

| | | | |
|---|---|---|---|
| 1,590,910 A | 6/1926 | Rumrill | 248/80 |
| 1,787,106 A | 12/1930 | Glazener | 248/51 |
| 2,082,099 A | 6/1937 | Cruser | 248/49 |
| 2,478,498 A * | 8/1949 | Myers | 248/51 |
| 2,620,232 A | 12/1952 | King | 239/229 |
| 2,684,512 A | 7/1954 | Beman | 24/26 |
| 2,687,329 A | 8/1954 | Hunter | 234/282 |
| 2,823,001 A * | 2/1958 | Whitefield | 248/49 |
| 2,891,750 A | 9/1959 | Bergquist | 248/58 |
| 3,021,102 A | 2/1962 | Kuempel | 248/49 |
| 3,053,358 A | 9/1962 | Gross | 52/696 |
| 3,098,349 A * | 7/1963 | Waninger | 59/78.1 |
| 3,321,571 A | 5/1967 | Lynch | 174/101 |
| 3,363,048 A | 1/1968 | Vaughn | 174/72 A |
| 3,588,012 A | 6/1971 | Schaefer | 248/80 |
| 3,687,406 A | 8/1972 | Krahe et al. | 248/55 |
| 4,068,824 A | 1/1978 | Flynn | 254/124 |
| 4,143,845 A | 3/1979 | Harris | 248/220.43 |
| 4,156,436 A | 5/1979 | Hawk | 137/899 |
| 4,337,934 A | 7/1982 | Caveney | 269/77 |
| 4,372,510 A | 2/1983 | Skypala | 248/58 |
| 4,432,519 A | 2/1984 | Wright | 248/49 |
| 4,570,437 A * | 2/1986 | Moritz | 59/78.1 |
| 4,582,281 A * | 4/1986 | Van Camp | 248/51 |

(List continued on next page.)

FOREIGN PATENT DOCUMENTS

| | | |
|---|---|---|
| DE | 1 540 323 | 2/1970 |
| DE | 1 615 074 | 4/1970 |
| DE | 7 120 422 | 8/1971 |
| DE | 2 155 625 | 5/1973 |
| DE | 2 358 863 | 5/1974 |
| DE | 7 435 122 | 10/1974 |
| DE | 3 742 448 | 6/1989 |
| EP | 0 298 825 | 1/1989 |
| EP | 0 553 039 | 7/1993 |
| EP | 0 556 137 | 8/1993 |
| EP | 0 571 307 | 11/1993 |
| FR | 2 395 449 | 1/1979 |

*Primary Examiner*—Leslie A. Braun
*Assistant Examiner*—Jon Szumny
(74) *Attorney, Agent, or Firm*—Carter, Deluca, Farrell & Schmidt, LLP

(57) ABSTRACT

A cable support apparatus is provided which includes at least two rigid cable support sections each defining a cable support pathway and a flexible member connecting the at least two rigid cable support sections to form a flexible junction between the at least two rigid cable support sections such that the cable support pathways of the at least two rigid cable support sections are aligned with each other.

A method of installing a cable support apparatus is provided which includes the steps of providing a at least two rigid cable support sections each defining a cable support pathway; and connecting the at least two rigid cable support sections to form a flexible junction between the at least two rigid cable support sections such that the cable support pathways of the at least two rigid cable support sections are aligned with each other.

7 Claims, 11 Drawing Sheets

U.S. PATENT DOCUMENTS

| | | | |
|---|---|---|---|
| 4,765,576 A | 8/1988 | Peled | 248/49 |
| 4,840,023 A | 6/1989 | Borsani | 59/78.1 |
| 5,123,618 A | 6/1992 | Guterman et al. | 248/49 |
| 5,240,209 A | 8/1993 | Kutsch | 248/49 |
| 5,323,988 A | 6/1994 | Handler | 248/49 |
| 5,361,756 A * | 11/1994 | Cernosek et al. | 248/51 |
| 5,524,327 A | 6/1996 | Mickel et al. | 24/115 A |
| 5,531,410 A | 7/1996 | Simon | 248/49 |
| 5,704,571 A | 1/1998 | Vargo | 248/58 |
| 5,839,702 A | 11/1998 | Jette | 248/49 |
| 5,868,361 A * | 2/1999 | Rinderer | 248/58 |
| 5,893,539 A * | 4/1999 | Tran et al. | 248/68.1 |
| 6,019,323 A | 2/2000 | Jette | 248/49 |
| 6,140,584 A * | 10/2000 | Baldissara | 174/68.3 |
| 6,170,249 B1 * | 1/2001 | Blasé et al. | 59/78.1 |
| 6,198,047 B1 * | 3/2001 | Barr | 174/68.3 |
| 6,247,871 B1 * | 6/2001 | Nickel et al. | 403/396 |

* cited by examiner

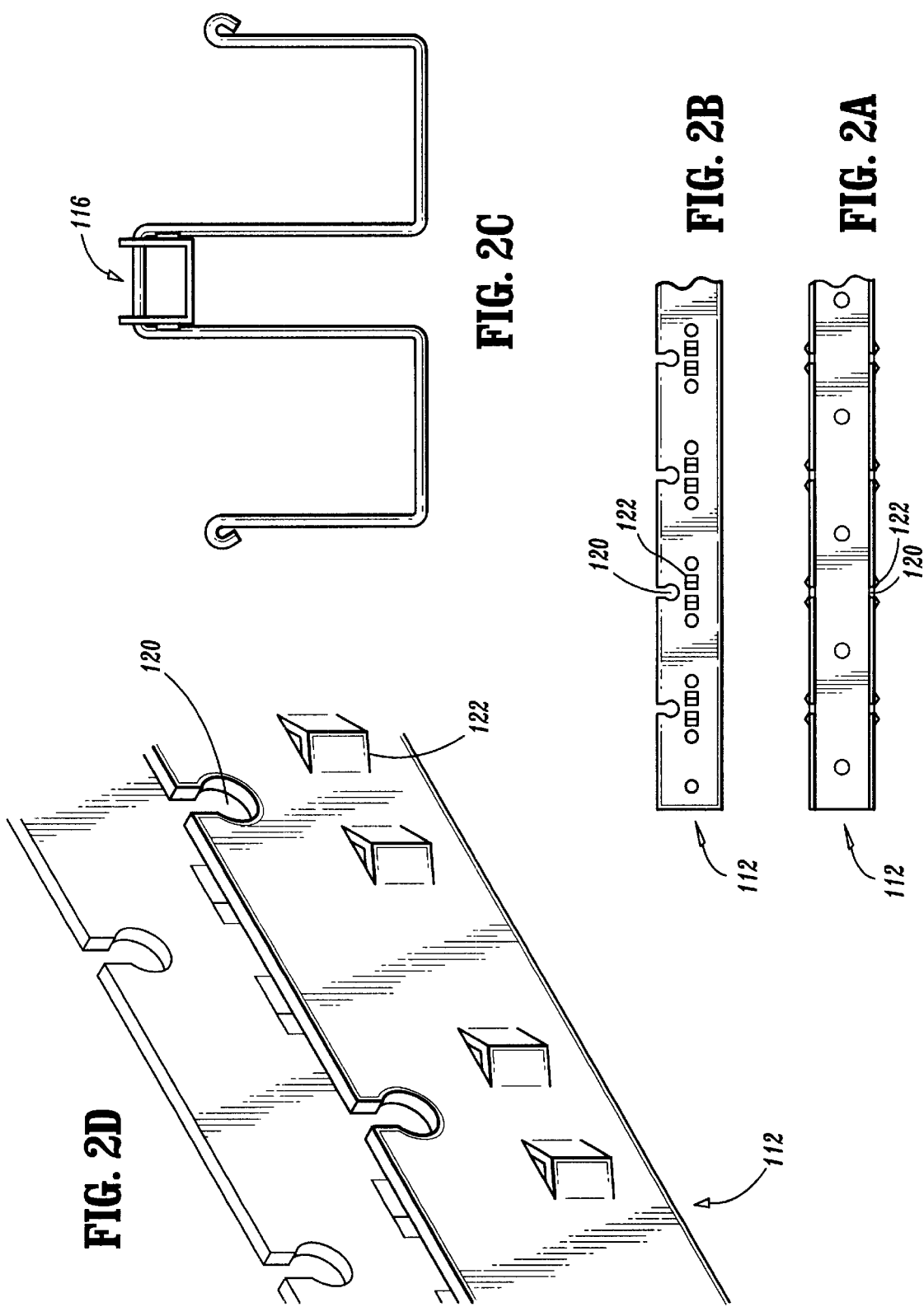

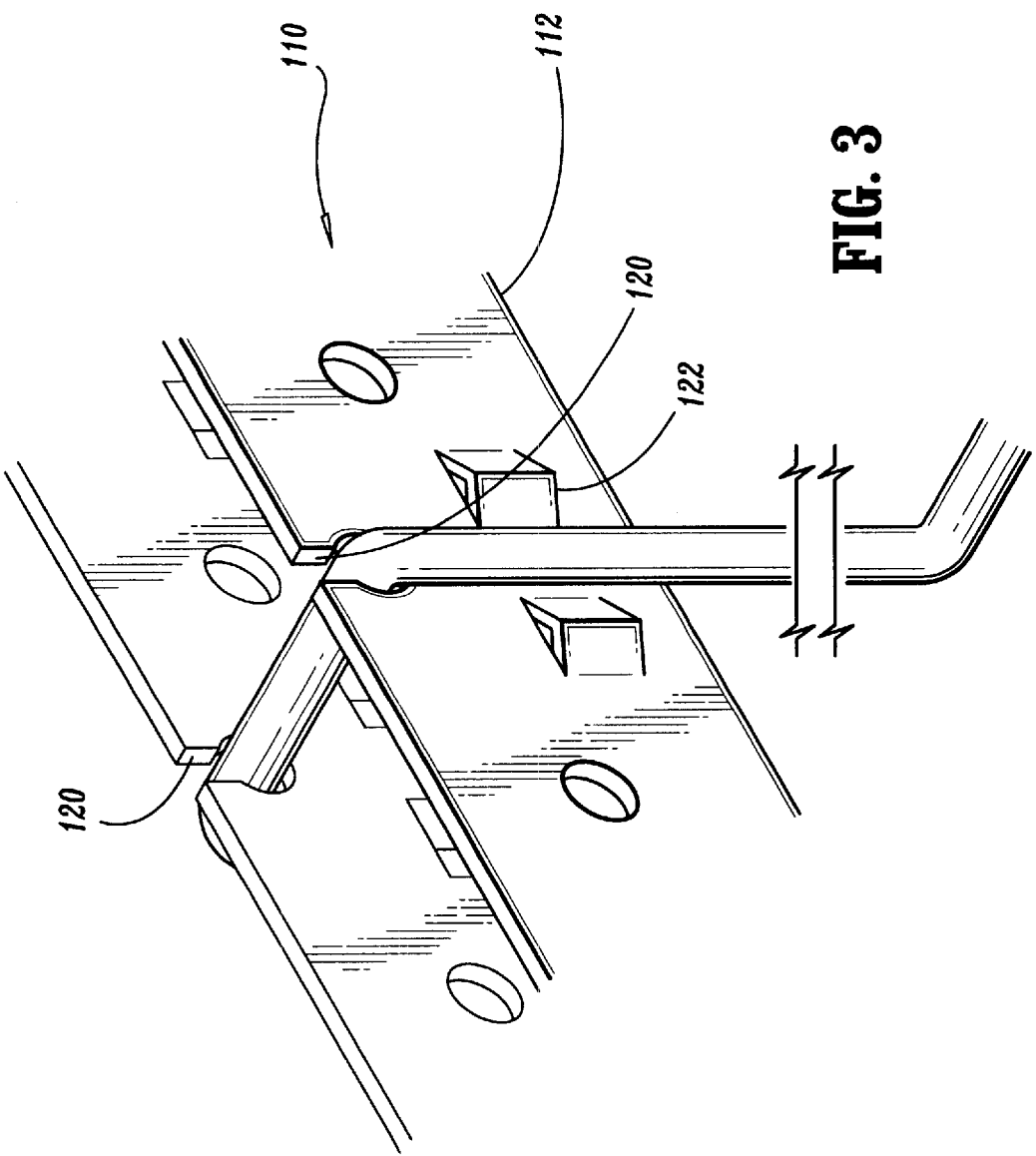

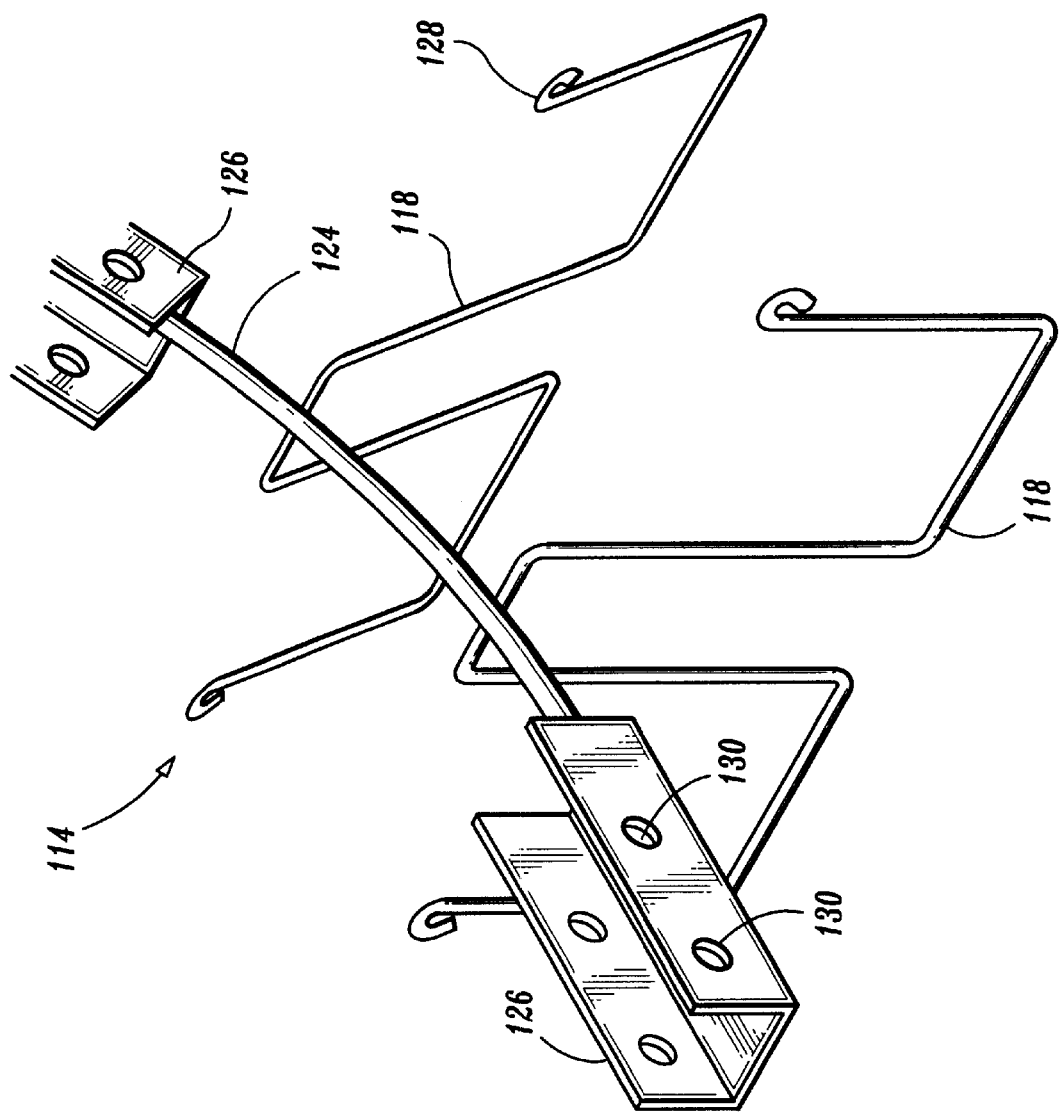

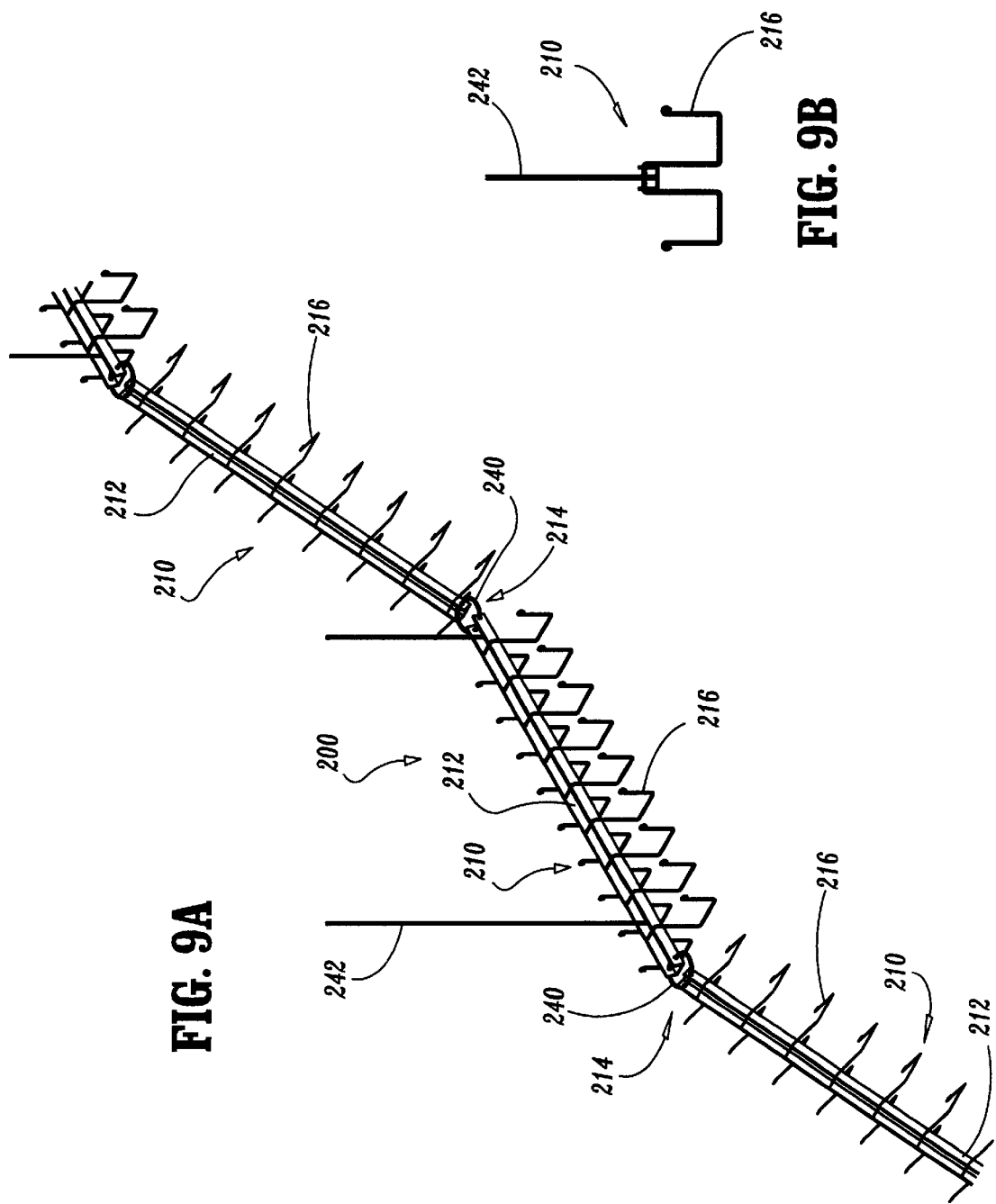

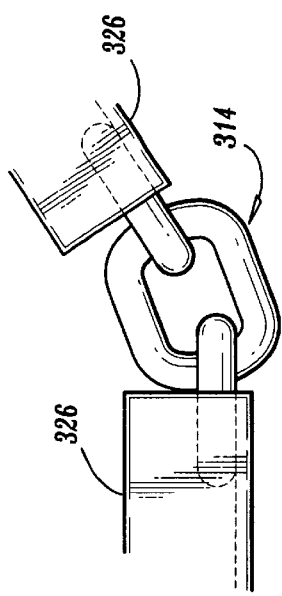
FIG. 11E
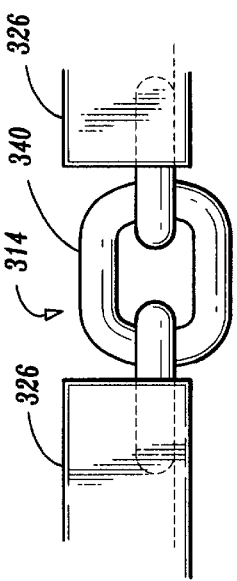
FIG. 11C
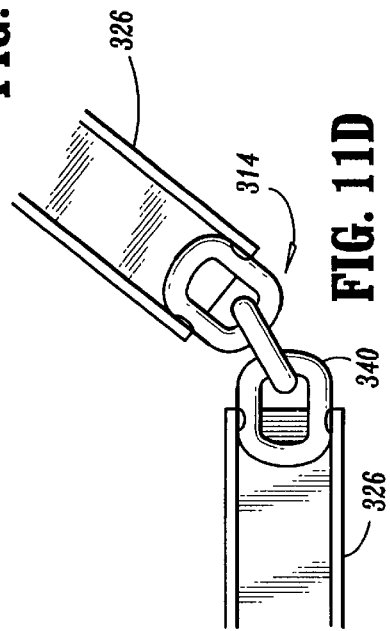
FIG. 11D
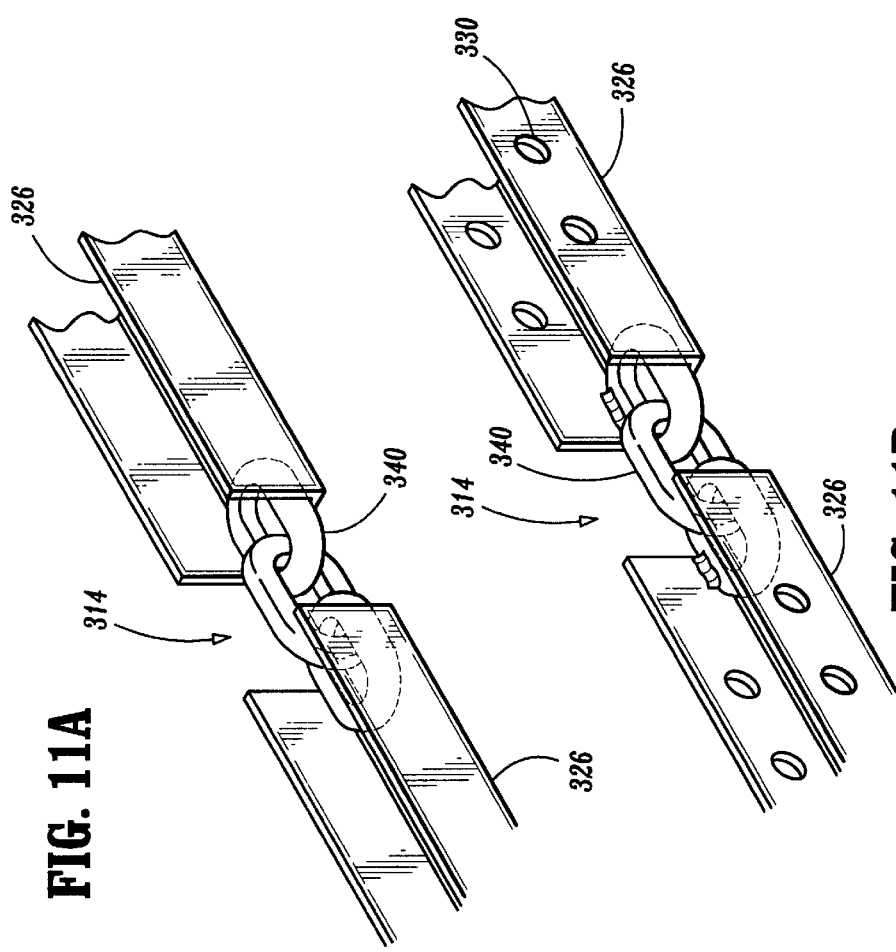
FIG. 11A
FIG. 11B

FLEXIBLE CABLE SUPPORT APPARATUS AND METHOD

The present application claims priority to U.S. Provisional Application Ser. No. 60/140,915 filed Jun. 24, 1999.

BACKGROUND

1. Technical Field

The present disclosure relates to cable support systems and more particularly to flexible coupling members of cable support systems for cable management and installation applications.

2. Background of Related Art

Due to the ever-increasing usage of computer and telephone networks, greater numbers of cable runs are required to interconnect the various systems and their associated peripheral devices. As a result, various cable management products have been developed to deal with the task of routing the numerous cable runs throughout a facility in an organized fashion. One problem that has made it difficult to rout cable runs through a facility is that each facility has obstacles of one kind or another in the path that the hardware systems are installed in to convey the cable runs. These obstacles, for example, ductwork, walls, beams, lighting fixtures, conduit, etc. are typically in place already at the time cable runs are installed in either new facilities or existing ones where new cable runs are installed. Installing cable-carrying systems, such as cable tray sections, in such an obstacle rich environment can prove to be labor intensive and, therefore, very costly.

A continuing need exists, therefore, for improved, more efficient systems and methods for routing the numerous cable runs around the various obstacles encountered in a facility.

SUMMARY

The present disclosure provides a unique cable support apparatus and method for installing the apparatus, which facilitates an efficient, cost effective solution to the problem of routing numerous cable, runs through a facility while detouring around physical obstacles present in the existing structure.

In one particular embodiment the present disclosure provides a cable support apparatus, which has at least two rigid cable support sections each defining a cable support pathway, a flexible member connecting the at least two rigid cable support sections to form a flexible junction between the at least two rigid cable support sections such that the cable support pathways of the at least two rigid cable support sections are aligned with each other.

One alternative flexible connecting member includes an elongate flexible spine member, and a plurality of support members, each of the plurality of support members attached to the elongate flexible spine member, the plurality of support members positioned relative one another to permit substantial bending of the elongate flexible spine member, the plurality of support members defining a cable pathway adapted to receive and support cables therein.

Another alternative flexible connecting member includes a plurality of individual link members joined together to form a flexible linkage.

The present disclosure also provides a method of installing a cable support apparatus which includes the steps of providing a at least two rigid cable support sections each defining a cable support pathway; and connecting the at least two rigid cable support sections to form a flexible junction between the at least two rigid cable support sections such that the cable support pathways of the at least two rigid cable support sections are aligned with each other.

BRIEF DESCRIPTION OF THE DRAWINGS

For a better understanding of the presently disclosed flexible cable support apparatus, reference is made to the following description of exemplary embodiments thereof, and to the accompanying drawing figures, wherein:

FIG. 2A is a top partial view of a spine member of a rigid cable support section;

FIG. 2B is a side partial view of a spine member of a rigid cable support section;

FIG. 2C is an enlarged detailed view of a cable support member;

FIG. 2D is an enlarged perspective partial view of a spine member, which details its point of interface with a cable support member;

FIG. 3 is an enlarged perspective partial view of a spine member with a cable support member installed therein;

FIG. 5 is a perspective partial view of one embodiment of a flexible connecting member using a bendable spine to join cable support sections of the flexible cable support apparatus;

FIG. 9A is a perspective view of an alternative embodiment of a flexible cable support apparatus using an alternative embodiment of a flexible connecting member to link cable support sections;

FIG. 9B is a side view illustrating one method of attaching the presently disclosed cable support apparatus to an overhead member;

FIG. 11A is an enlarged perspective view of another alternative 5 embodiment of the flexible cable support apparatus using chain link as a flexible connecting member;

FIG. 11B is an enlarged detailed perspective view of the chain link flexible connecting member embodiment.

FIG. 11C is a side view of the chain link flexible connecting member 10 embodiment in a straight connection;

FIG. 11D is a top view of the chain link flexible connecting member embodiment in a lateral bend; and FIG. 11E is a side view of the chain link flexible connecting member embodiment in a vertical bend.

Figure 1:
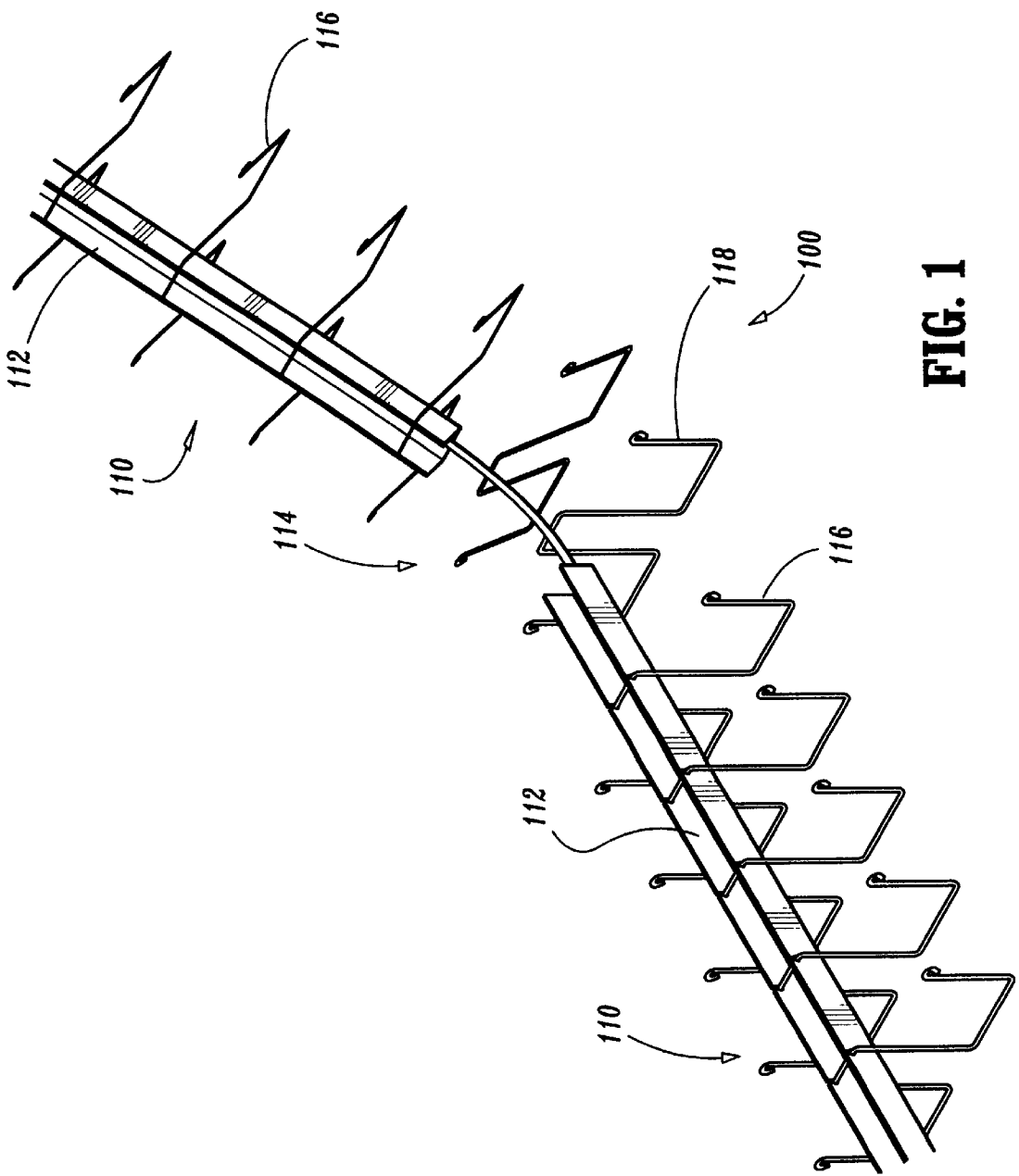
FIG. 1 is a perspective view of one embodiment of a flexible cable support apparatus constructed in accordance with the present disclosure.

DETAILED DESCRIPTION OF PREFERRED EMBODIMENTS:

Referring to the drawings in detail, and initially to FIG. 1, the presently disclosed flexible cable support apparatus 100 is shown having a vertical bend formed therein. Such bends can be formed laterally or vertically without the use of tools or other devices. Flexible cable support apparatus 100 includes a plurality of rigid, i.e., fixed configuration, cable support sections, such as sections 110, joined together by a bendable connecting member 114 which includes a spine member 124 having a series of cable support members 118 permanently attached thereto. Although shown as straight sections, rigid cable support sections 110 may be of any fixed configuration. For example, support sections 110 may be fixed, angled or curved sections in either two or three dimensions.

Cable support members 116 are attached to rigid spine member 112 to form cable support sections 110. Cable support members 116 of a flexible cable support apparatus 100 may support a plurality of cables. Flexible cable support apparatus 100 is preferably configured and dimensioned so that it can be readily installed beneath raised floor systems, on existing floors, on walls and risers or suspended from a ceiling.

Referring now to FIGS. 2A and 2B, top and side views of cable support section 110 are shown with a plurality of vertically cut mating holes 120 formed therein and spaced at regular intervals. Each cut out mating hole 120 of a cable support section 110 serves as a mating point for a cable support member 116 which can be installed therein. In FIG. 2C details are provided of cable support member 116. As shown in FIG. 2D, alignment guides (for example, such as triangular shaped cams) 122 are formed on cable support section 110 to preclude the rotation of cable support members 116 (as best shown in FIG. 3). Paired mating holes 120 are formed perpendicular to a longitudinal axis of the cable support section 110.

Referring to FIG. 3, the interface between an installed cable support member 116 and spine member 112 of cable support section 110 will now be described in detail. Cable support member 116 is placed into mating hole 120 of a U-shaped channel of cable support section 110. A pair of alignment guides 122 are positioned on cable support section 110 on either side of the installed position of each of the vertical arms of cable support member 116. Alignment guides 122 are positioned to provide lateral support for each cable support member 116.

Figure 4F:
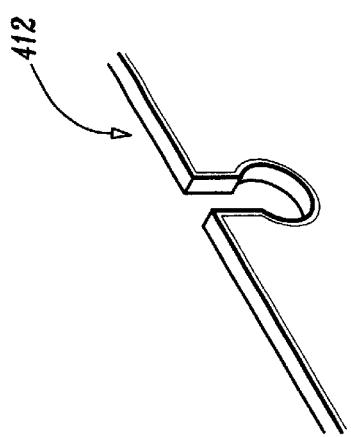
FIGS. 4A–4F are enlarged perspective and profile views of alternative embodiments for fabricating the attachment points for the cable support members on spine member of the cable support section.
Figure 4E:
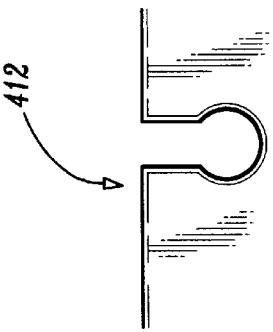
Figure 4D:
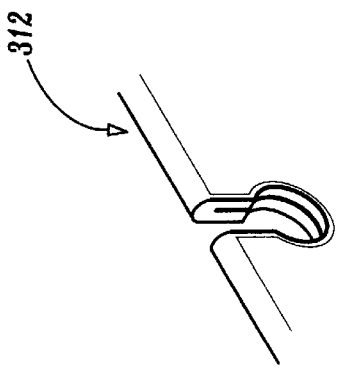
Figure 4C:
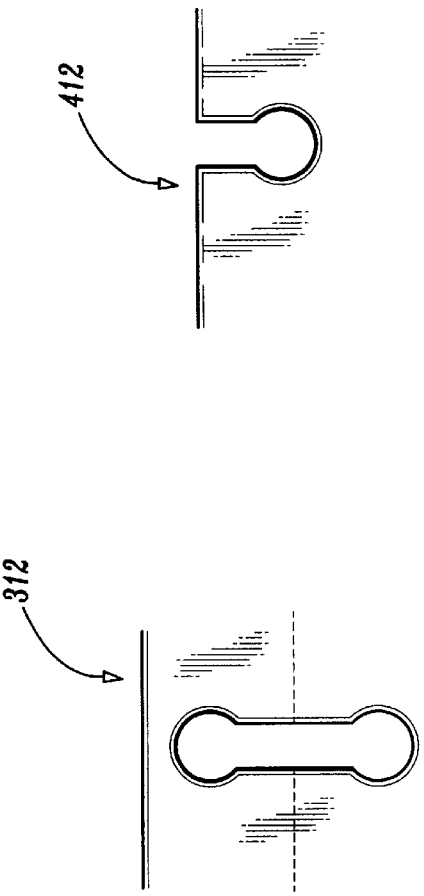
Figure 4B:
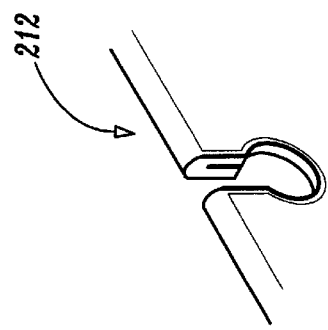
Figure 4A:
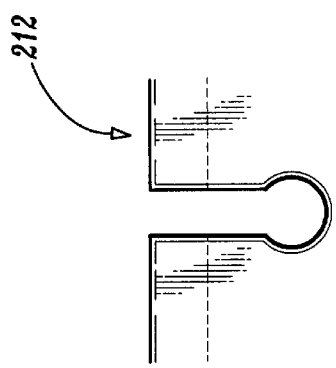

In FIGS. 4A, 4B, and 4C alternative embodiments are shown for fabricating U-shaped spine member 112 of cable support section 110 using formed sheet metal. The free upward pointing ends of the spine member 112 can be formed with a short bend, as in FIG. 4A, to form spine member 212, with a bend that accommodates the full depth of the cut out dimensions for mating hole 120, as in FIG. 4B, to form spine member 312, or as shown in FIG. 4C to form spine member 412 without any bend from thicker sheet metal stock.

Figure 6B:
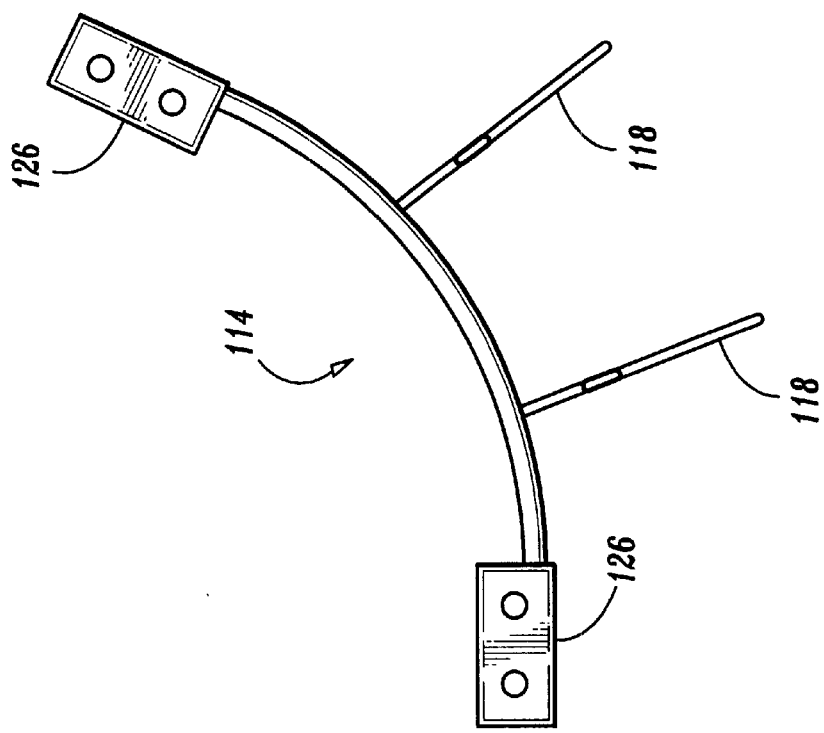
FIG. 6B is a side view of the same embodiment in a vertical bend.
Figure 6A:
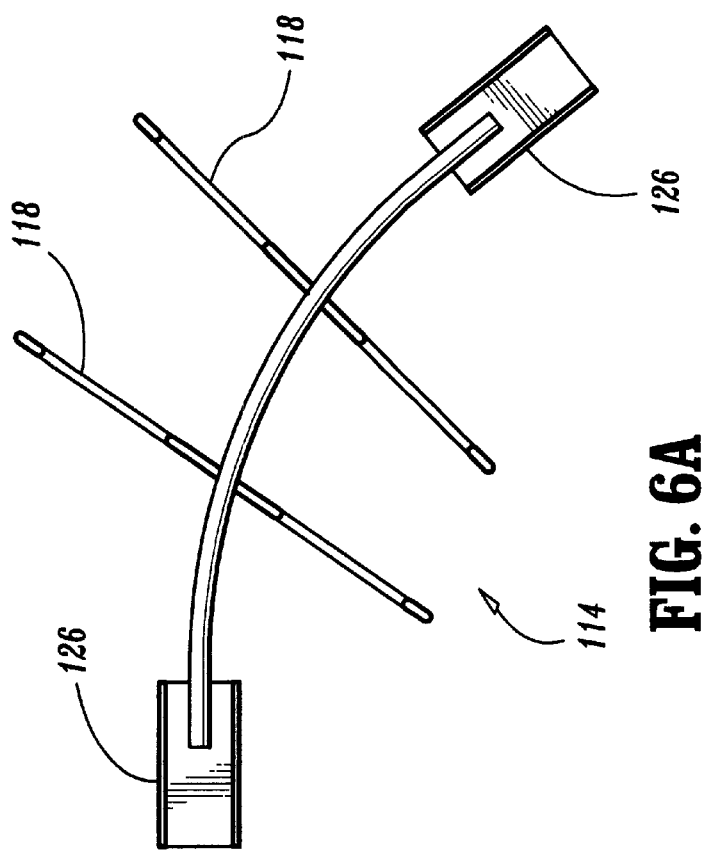
FIG. 6A is a top view of the bendable spine flexible connecting member embodiment for joining cable support sections in a lateral bend.

One illustrative embodiment for joining the cable support sections 110 of flexible cable support apparatus 100 is flexible connecting member 114 illustrated in FIGS. 5, 6A, and 6B. Flexible connecting member 114 has a bendable spine 124 and U-shaped coupling or attachment members 126 secured on each end that interface with and provides a rigid attachment to section 110. Attachment members 126 each have a pair of through holes 130 formed therein for connecting with section 110. A series of cable support members 118 are secured, for example, by welding support members 118 to spine 124 of flexible connecting member 114 at regular intervals. Cable support members 118 may be attached either above or below the single spine 124. Support members 118 are formed in a fashion to allow the maneuvering and protection of any cables supported by the system and may have internally or externally turned ends 128. As shown in FIGS. 6A and 6B, flexible connecting member 114 may be bent either laterally or vertically respectively. The flexible connecting member 114 includes a series of formed wire cable support members 118 welded to spine 124. Spine 124 of flexible connecting member 114 can be bent by hand in any direction necessary for a particular installation.

Figure 7E:
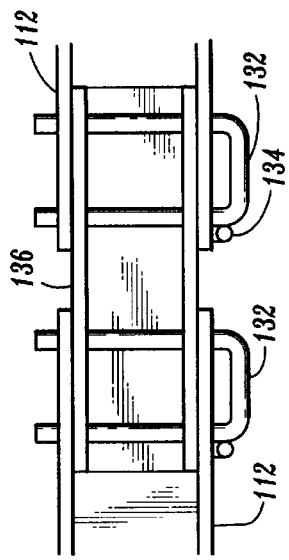
FIG. 7E is a top view of a attachment end connecting member placed inside two spine members with connecting pins attached to form a rigid joint.
Figure 7D:
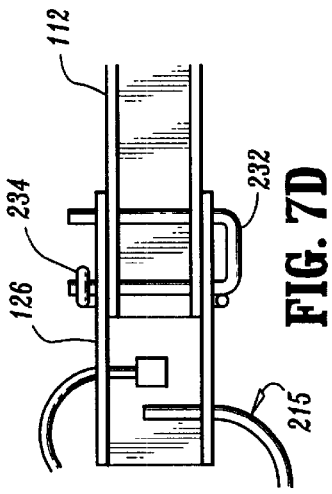
FIG. 7D is a top view of one embodiment of an attachment end of a flexible connecting member placed outside a spine member with a connecting pin attached.
Figure 7C:
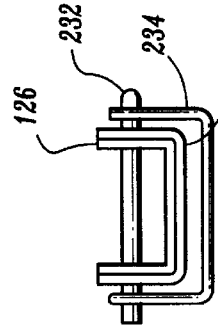
FIG. 7C is a front view of an attachment end of a connecting member placed inside a spine member with a connecting pin attached.
Figure 7A:
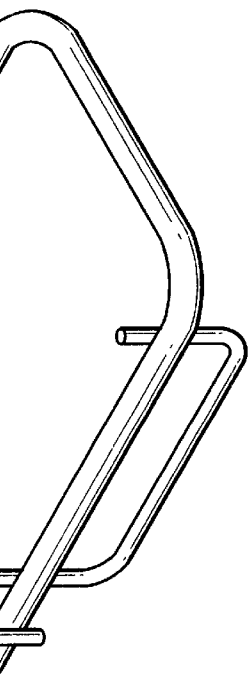
FIG. 7A is a detailed enlarged perspective of a connecting pin, which joins attachment ends of connecting members with adjacent cable support sections.
Figure 7B:
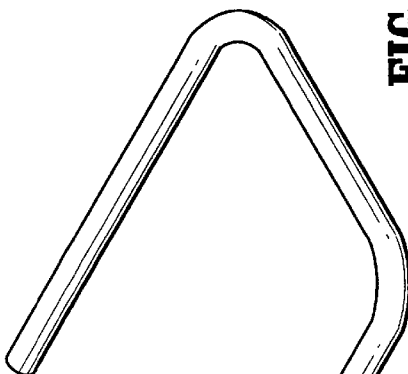
FIG. 7B is a detailed enlarged perspective of one embodiment of a connecting pin, which joins attachment ends of connecting members with adjacent cable support sections.

The manner of attaching an attachment or connecting end 126 of a flexible connecting member 114 to a spine member 112 of section 110 is shown in FIGS. 7A–7D. A U-shaped connecting pin 132 is shown in FIG. 7A with a locking spring bar 134 welded to the inside of the pin and hooking to the outside of the pin. In an alternative embodiment, shown in FIG. 7B, spring bar 234 is welded to the exterior side of connecting pin 232 and hooks inward. As shown in FIGS. 7C and 7D, U-shaped attachment end 126 is placed inside or outside of spine 112 of section 110, with its pairs of through holes 130 aligned with the through holes of spine 112. Then, U-shaped pin, 132 or 232, is inserted through the U-shaped spine 112 and the attachment end 126 to form a rigid joint. As depicted in FIG. 7C, spring bar 134 or 234 is then placed around the exterior of the joined members and hooked around the attached free end of U-shaped connecting pin 132 or 232. Preferably, attachment end 126 is attached to flexible connecting member 114, but connecting members can also be other types of flexible members, as in FIG. 7D, or a rigid straight connecting member 136 as in FIG. 7E.

Figure 8B:
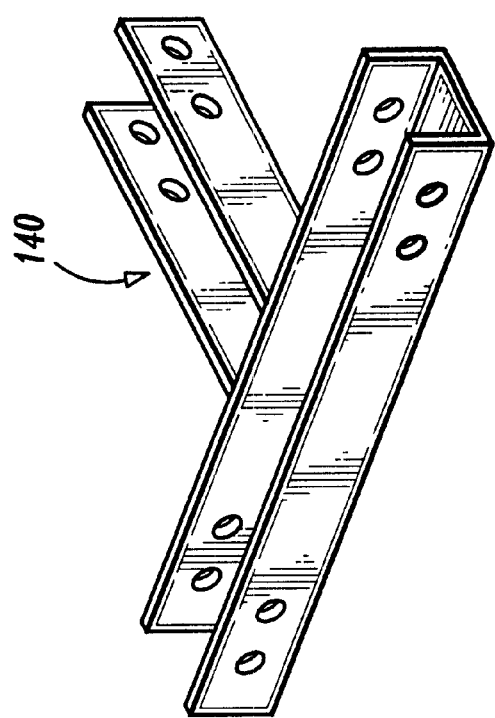
FIG. 8B is a perspective view of a "T" intersection member.
Figure 8A:
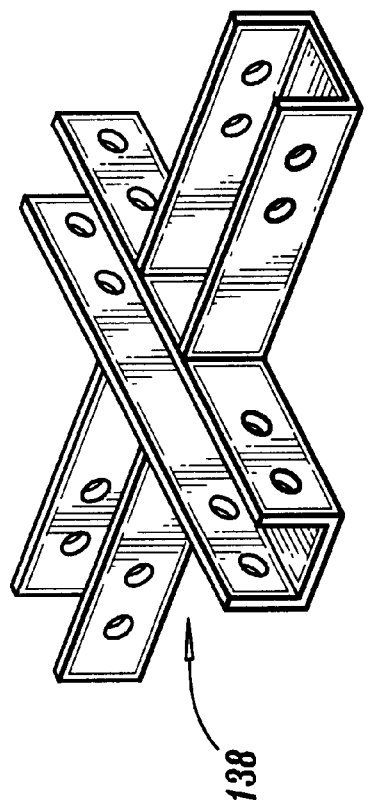
FIG. 8A is a perspective view of a "cross" type intersection member, which can be installed between intersecting cable support sections.

In FIGS. 8A and 8B specialized intersecting members such as an "X" type intersection 138 and a "T" type intersection 140 may be used at various junctions between separate cable support apparatus sections. These specialized intersection members provide an increased versatility for the flexible cable support apparatus users.

Figure 10A:
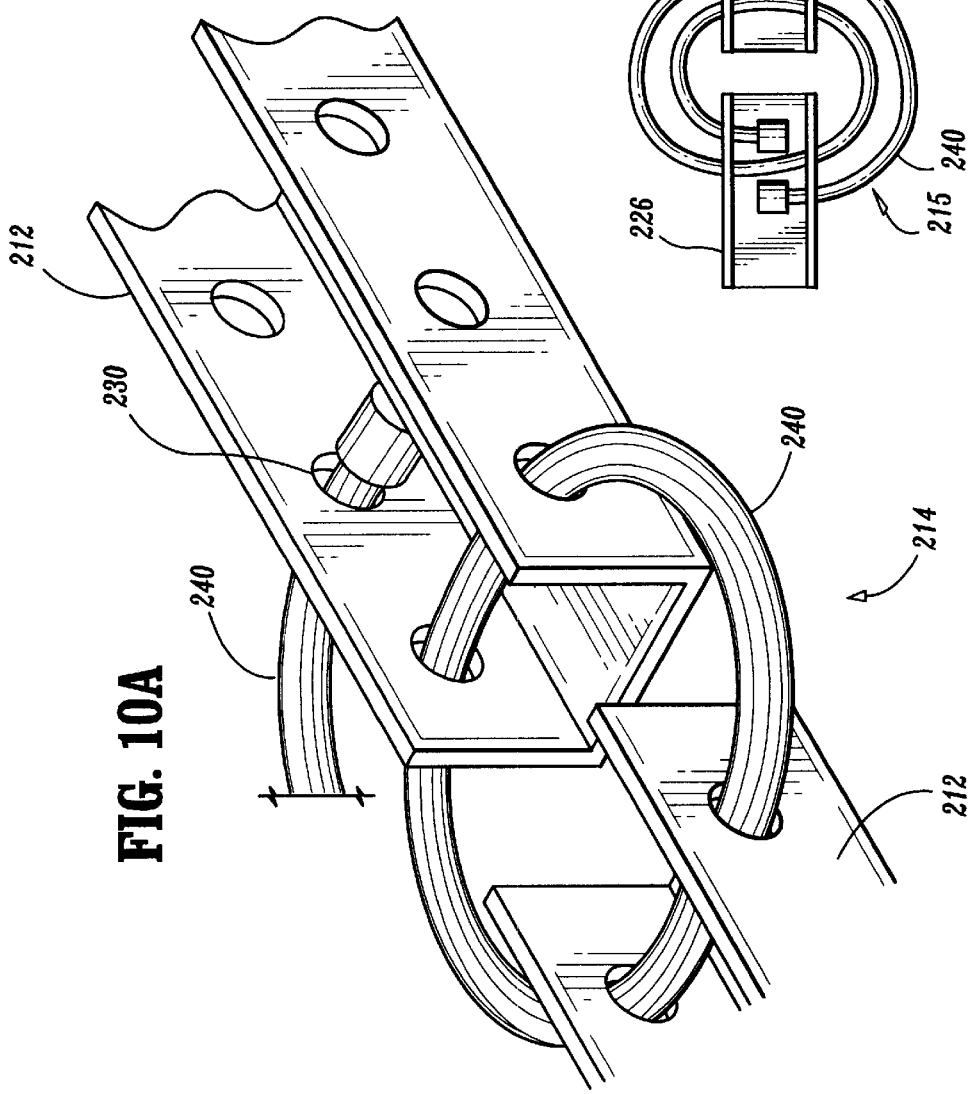
FIG. 10A is an enlarged perspective view of an alternative embodiment of the flexible cable support apparatus using a cable to form a flexible connecting member as described in the present disclosure.
Figure 10D:
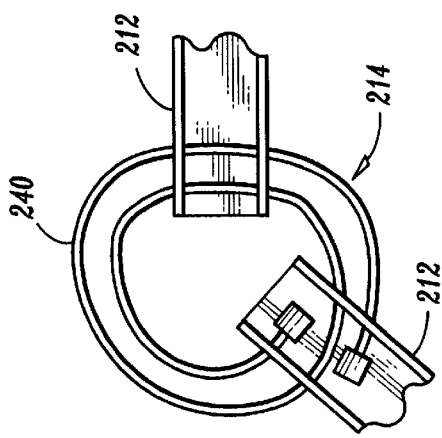
FIG. 10D is a top view of one embodiment of a connecting member, which uses a cable as a flexible connecting member between two spine members in a lateral bend.
Figure 10C:
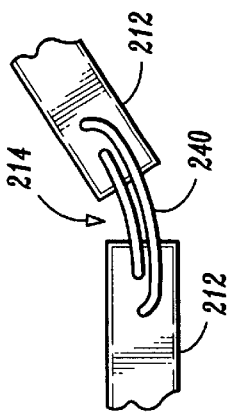
FIG. 10C is a side view of one embodiment of a connecting member, which uses a cable as a flexible connecting member between two spine members in a vertical bend.
Figure 10B:
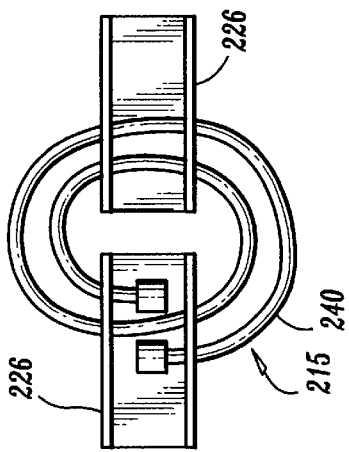
FIG. 10B is a top view of one embodiment of a flexible connecting member, which uses a cable as its flexible member to make a straight connection.

In FIGS. 9 and 10A–10D an alternative embodiment of the flexible cable support apparatus of the present disclosure is designated by the reference numeral 200. Individual cable support sections 210 are shown in FIG. 9A flexibly connected by cables 240, which form connecting member 214. In an alternative embodiment, flexible cables 240 are integrated with coupling or attachment members 226 to form connecting member 215 as shown in FIGS. 7D and 10B. Cable support members 216 are attached to the cable support sections 210. Flexible cable support apparatus 200 can be supported by vertical suspension rods or cables 242 attached to the ceiling or joists, for example, as shown in FIGS. 9A and 9B. The details of the connecting cable flexible member 214 of flexible cable support apparatus 200 are shown in FIGS. 10A–10D. Flexible cable 240 that forms the flexible connecting member 214 is threaded through holes 230 formed near the ends of spine members 212 of cable support sections 210 making a straight connection in FIG. 10A in an isometric view, a vertical view of a straight flexible connection in FIG. 10B, a vertical bend in FIG. 10C, and a lateral bend in FIG. 10D.

Referring to FIGS. 11A–11D, a further alternative embodiment of the flexible cable support apparatus designated 300 and using flexible connecting member 314 is shown. Flexible connecting member 314 uses chain links 340 secured to U-shaped attachment end 326 with its paired through holes 330. Flexible connecting member 314 facilitates a straight connection FIG. 11C; a lateral bend connection FIG. 11D; and a vertical bend without requiring any additional labor or materials in FIG. 11E.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the appended claims.

What is claimed is:

1. A cable support apparatus, which comprises:
    at least two rigid cable support sections each including a plurality of cable support members defining a cable support pathway; and
    an elongate flexible member connecting the at least two rigid cable support sections to form a flexible junction between the at least two rigid cable support sections, said elongate flexible member including a flexible spine member, a plurality of cable support members attached to the elongate flexible member along the length thereof, and an attachment member secured on each end of said elongate flexible member, whereby each attachment member is configured and adapted to interface with and provide a rigid attachment to an end of each of said at least two rigid cable support sections, the plurality of cable support members being positioned relative to one another to permit substantial bending, by hand, of the elongate flexible member in at least one of a vertical and a horizontal direction to a selected set configuration; the plurality of cable support members defining at least one cable pathway adapted to receive and support a cable therein such that the elongate flexible member remains substantially in said selected set configuration;
    wherein each of said attachment members is a substantially U-shaped channel having a pair of side walls and an interconnecting bottom wall.

2. The cable support apparatus of claim 1, wherein each of said at least two rigid cable support sections is a substantially elongate U-shaped channel having a pair of side walls and an interconnecting bottom wall, and wherein each of said pairs of side walls includes a plurality of through holes formed therein.

3. The cable support apparatus of claim 2, wherein each of said attachment members is configured and adapted to be disposed either within or without either end of said at least two rigid cable support sections and wherein each attachment member further comprises a plurality of through holes formed in each side wall of said U-shaped channel, said through holes of said attachment member being configured and adapted to cooperate with said plurality of through holes formed in said side walls of said rigid cable support sections.

4. The cable support apparatus of claim 3, further comprising securing means configured and adapted to simultaneously engage said through holes of said attachment members and said through holes of said cable support sections to thereby secure said attachment members to said cable support member.

5. The cable support apparatus of claim 2, wherein said pair of side walls of each of said at least two rigid cable support sections is provided with a plurality of vertical mating slots, formed therein and extending through a free upward end of said pair of side walls, wherein said mating slots from one side wall are orthogonally aligned with said mating slots of the other side wall, said mating slots being configured and adapted to receive a cable support member therein via a snap fit connection.

6. The cable support apparatus of claim 5, wherein each of said at least two cable support sections further comprises a pair of alignment guides formed on either side of said each mating slot thereby providing lateral support for each cable support member.

7. A method of installing a cable support apparatus comprising the steps of:
    providing at least two rigid cable support sections each defining a cable support pathway;
    providing an elongate flexible member connecting the at least two rigid cable support sections to form a flexible junction between the at least two rigid cable support sections, said
    elongate flexible member including a flexible spine member, a plurality of cable support members attached to the elongate flexible member along the length thereof, and an attachment member secured on each end of said elongate flexible member, whereby each attachment member is configured and adapted to interface with and provide a rigid attachment to an end of each of said at least two rigid cable support sections, the plurality of cable support members being positioned relative to one another to permit substantial bending, by hand, of the elongate flexible member in at least one of a vertical and a horizontal direction to a selected set configuration; the plurality of cable support members defining at least one cable pathway adapted to receive and support a cable therein such that the elongate flexible member remains substantially in said selected set configuration; wherein each of said attachment members is a substantially U-shaped channel having a pair of side walls and an interconnecting bottom wall; and
    connecting the at least two rigid cable support sections, via said elongate flexible member, to form a flexible junction between the at least two rigid cable support sections such that a first of said at least two rigid cable support sections can articulate in any direction relative to a second of said at least two rigid cable support sections.

\* \* \* \* \*